S. B. MILLARD.
OPTICIAN'S MEASURE.
APPLICATION FILED APR. 19, 1918.

1,281,806.

Patented Oct. 15, 1918.

S. B. Millard, Inventor

Witness

By C. A. Snow & Co.
Attorneys

UNITED STATES PATENT OFFICE.

SAMUEL B. MILLARD, OF NEW ORLEANS, LOUISIANA.

OPTICIAN'S MEASURE.

1,281,806. Specification of Letters Patent. Patented Oct. 15, 1918.

Application filed April 19, 1918. Serial No. 229,545.

*To all whom it may concern:*

Be it known that I, SAMUEL B. MILLARD, a citizen of the United States, residing at New Orleans, in the parish of Orleans and State of Louisiana, have invented a new and useful Optician's Measure, of which the following is a specification.

By way of explanation, it may be stated that the bridge of a pair of spectacles must conform to the bridge line of the nose of the wearer, since otherwise, the bridge of the spectacles will cut into the wearer's nose, with obvious discomfort, or else the bows of the spectacles will gradually become bent, the bridge of the spectacles conforming to the bridge line, the lenses being disposed at an improper angle to the eyes of the patient.

In view of the foregoing, one object of the invention is to provide a longitudinally adjustable member having transverse markings inclined at different angles with respect to one edge of the member, and adapted to be brought successively into coincidence with the bridge line of a patient's nose, when the member is moved endwise, thereby to determine the angle for spectacle bridge.

Another object of the invention is to provide means whereby a member of this kind above mentioned may be supported for longitudinal movement for adjustment.

In the accompanying drawings:—

Figure 1:
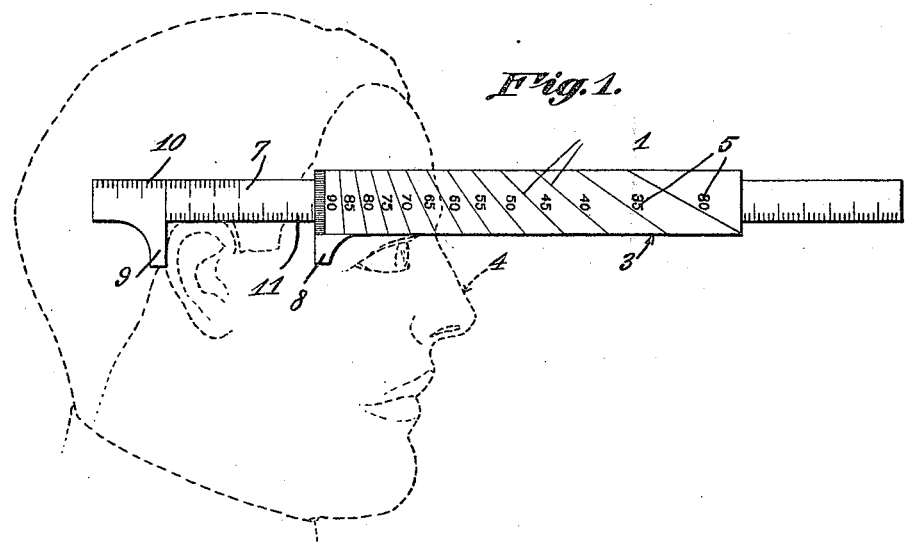
Figure 2:
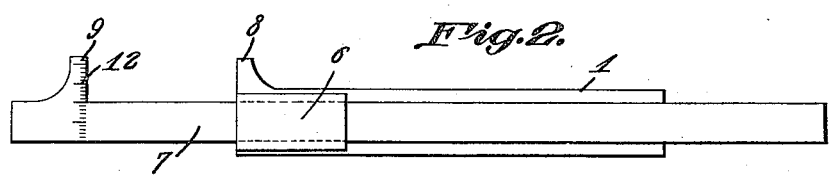

Figure 1 shows in side elevation, a device constructed in accordance with the invention, arranged in operative relation with respect to the face of the patient;

And Fig. 2 is an elevation wherein there is disclosed the opposite side of the structure from that which appears in Fig. 1.

In carrying out the present invention there is provided a member 1 having a plurality of transverse markings 2 inclined at different angles with respect to one longitudinal edge 3 of the member and adapted to be brought successively into coincidence with the bridge line 4 of a patient's nose, when the member 1 is moved endwise, thereby to determine the crest angle for a spectacle bridge. By "crest angle" I mean the slope of the inner surface of the bridge of a pair of spectacles, with respect to the plane defined by the straight portions of the bows, in a pair of spectacles wherein the said inner surface is disposed parallel to the outer edge of the nose of the wearer when the bows are supported on the ears of the wearer. The member 1 may be supplied with numerals 5 individual to markings 2 and indicating the angles defined between the said markings, and the edge 3. In Fig. 1, the member 1 has been moved endwise until the appropriate marking 2 has been brought in coincidence with the bridge line 4 of the patient's nose, and the operator can ascertain by inspection, that the bridge line 4 has a 65 degree pitch. The spectacle bridge should be inclined accordingly, and when properly shaped will not cut edgewise into the nose of the patient.

The member 1 may be supplied with a guide 6 receiving a second member 7 adapted to be supported on the ear of the patient, it being possible to move the membr 1 upon the member 7 until the proper marking 2 has been brought into conincidence with the bridge line 4. The member 1 may be provided at its rear end with a projection 8 whereby the member 1 may be slid on the member 7, and the member 7 may be provided near its rear end with a projection 9 adapted to engage the ear of the patient. The member 7 may be supplied with longitudinal scales 10 and 11, and may carry a transverse scale 12, rendering the measure capable of many uses, over and above determining the crest angle of a spectacle bridge.

Having thus described the invention, what is claimed is:—

A device for determining the angle between the inner surface of the bridge of a pair of spectacles and the plane defined by the straight portions of the bows of the spectacles, comprising a member having a plurality of transverse markings spaced longitudinally of said member and inclined at different angles with respect to one longitudinal edge thereof; and an ear-supported element whereon said member is mounted for right-line sliding movement to bring the markings one after another into coincidence with the bridge line of a patient's nose.

In testimony that I claim the foregoing as my own, I have hereto affixed my signature in the presence of two witnesses.

SAMUEL B. MILLARD.

Witnesses:
LOUIS F. GOLDSMITH,
F. W. EVANS.

Copies of this patent may be obtained for five cents each, by addressing the "Commissioner of Patents, Washington, D. C."